(12) United States Patent
Tietema et al.

(10) Patent No.: US 12,010,140 B1
(45) Date of Patent: Jun. 11, 2024

(54) METERING INTERACTIVE ELECTRONIC ACTIVITIES

(71) Applicant: Amazon Technologies, Inc., Seattle, WA (US)

(72) Inventors: Jennie Tietema, Seattle, WA (US); Aaron Friedman, Rocklin, CA (US); Giridhar Kalpathy Narayanan, Sammamish, WA (US); Siddhartha Shankara Rao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/092,511

(22) Filed: Nov. 9, 2020

(51) Int. Cl.
| | |
|---|---|
| *H04L 29/06* | (2006.01) |
| *H04L 9/40* | (2022.01) |
| *H04L 12/14* | (2006.01) |
| *H04L 65/403* | (2022.01) |
| *H04L 67/50* | (2022.01) |
| *H04L 67/306* | (2022.01) |

(52) U.S. Cl.
CPC ...... *H04L 63/1466* (2013.01); *H04L 12/1439* (2013.01); *H04L 63/102* (2013.01); *H04L 65/403* (2013.01); *H04L 67/535* (2022.05); *H04L 67/306* (2013.01)

(58) Field of Classification Search
CPC ..... H04L 12/1822; H04L 51/04; H04L 6/306; H04L 12/1881; H04L 65/403; H04L 12/1813; H04L 63/08; H04L 63/102; H04L 65/4061; H04N 7/152; H04N 7/181; G06Q 10/10; G06Q 10/103; G06Q 10/109; G06Q 10/107; G06Q 50/01; G06F 21/105; G06F 16/9024; G06F 21/32; A63F 13/75; H04M 7/006; H04M 3/56; H04M 3/567; H04M 3/5133
See application file for complete search history.

(56) References Cited

U.S. PATENT DOCUMENTS

| | | | |
|---|---|---|---|
| 8,392,503 B2 * | 3/2013 | Kuhlke | H04L 12/1822 709/204 |
| 9,912,676 B1 * | 3/2018 | Fieldman | H04L 63/08 |
| 10,021,245 B1 * | 7/2018 | Koster | H04M 3/5133 |
| 2003/0014488 A1 * | 1/2003 | Dalal | H04M 3/567 709/204 |
| 2003/0216962 A1 * | 11/2003 | Heller | A63F 13/75 705/318 |
| 2006/0242232 A1 * | 10/2006 | Murillo | H04L 12/1813 709/204 |

(Continued)

FOREIGN PATENT DOCUMENTS

WO WO-03036444 A2 * 5/2003 .......... G06F 21/105

*Primary Examiner* — Dustin Nguyen
(74) *Attorney, Agent, or Firm* — BakerHostetler

(57) ABSTRACT

Implementations for metering media conferences based on active users are described. A plurality of media conferences are established by a media conferencing service. Unique users participating in the media conferences are determined. A number of times that each unique user uses the media conferencing service during a first time period is determined. A metric for use of the media conferencing service is determined based on the number of times that each unique user uses the media conferencing service. The metric for using the media conferencing service is output.

15 Claims, 7 Drawing Sheets

(56) References Cited

U.S. PATENT DOCUMENTS

| | | | | |
|---|---|---|---|---|
| 2007/0061405 | A1* | 3/2007 | Keohane | G06Q 10/109 709/207 |
| 2007/0064899 | A1* | 3/2007 | Boss | H04L 51/04 379/201.01 |
| 2007/0100941 | A1* | 5/2007 | Lee | H04L 65/4061 709/227 |
| 2007/0112918 | A1* | 5/2007 | Berstis | G06Q 10/107 709/206 |
| 2008/0177600 | A1* | 7/2008 | McCarthy | G06Q 10/10 705/7.33 |
| 2009/0251529 | A1* | 10/2009 | Tucker | H04N 7/181 348/14.09 |
| 2011/0247054 | A1* | 10/2011 | Roberts | H04L 63/102 726/4 |
| 2011/0307550 | A1* | 12/2011 | Bastide | H04M 3/56 709/204 |
| 2012/0036195 | A1* | 2/2012 | Kennedy | H04L 51/04 709/206 |
| 2013/0007122 | A1* | 1/2013 | Su | G06Q 50/01 709/204 |
| 2013/0169742 | A1* | 7/2013 | Wu | H04N 7/152 348/14.08 |
| 2015/0358172 | A1* | 12/2015 | Kinomoto | H04L 12/1881 705/28 |
| 2016/0337293 | A1* | 11/2016 | Koum | H04L 67/306 |
| 2017/0366675 | A1* | 12/2017 | Broadworth | H04M 7/006 |
| 2018/0203601 | A1* | 7/2018 | Birchfield | G06F 21/32 |
| 2018/0359293 | A1* | 12/2018 | Faulkner | H04L 65/403 |
| 2020/0242527 | A1* | 7/2020 | Das | G06F 16/9024 |
| 2021/0406804 | A1* | 12/2021 | Hamid | G06Q 10/103 |

* cited by examiner

METERING INTERACTIVE ELECTRONIC ACTIVITIES

BACKGROUND

Currently many meetings are held that involve multiple parties at multiple locations. Thus, such meetings are often handled electronically and may involve audio and/or video in the form of media conferencing among participants. The electronic meetings are generally hosted by one or more hosting servers with which the various parties communicate over a network, such as, for example, the Internet. The participants generally communicate with the hosting servers using electronic devices such as, for example, smart phones, tablets, computers, etc. The metering and cost for such media conferencing can vary based on the service. Traditionally, metering has been based on duration of a meeting, such as a cost per minute. However, such metering can result in unpredictable costs for an organization with many users.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DETAILED DESCRIPTION

This disclosure describes techniques and architecture for identifying unique users of a media conferencing service and determining a metric for using a media conferencing service based on the number of times that each unique user uses the media conferencing service. For example, participants may subscribe to or account for media conferencing based on the number of days they use the media conferencing service. Therefore, the number of days that each participant and/or subscriber of an organization uses the media conferencing service should be tracked and metered.

However, some users may attempt to spoof the media conferencing service by allowing multiple users to use the media conferencing service using a single credential. For example, multiple devices can concurrently use the media conferencing service after logging in with the single credential. Such misuse can negatively impact the provider of the conferencing media conferencing service as well as participants and/or subscribers. Therefore, determining the number of unique users that use a conferencing service in a given period can enhance the capability of a service by properly planning for the actual capacity needs and can also prevent misuse.

Certain implementations and embodiments of the disclosure are described more fully below with reference to the accompanying figures, in which various aspects are shown. However, the various aspects may be implemented in many different forms and should not be construed as limited to the specific implementations described herein. The disclosure encompasses variations of the described embodiments.

Figure 1:
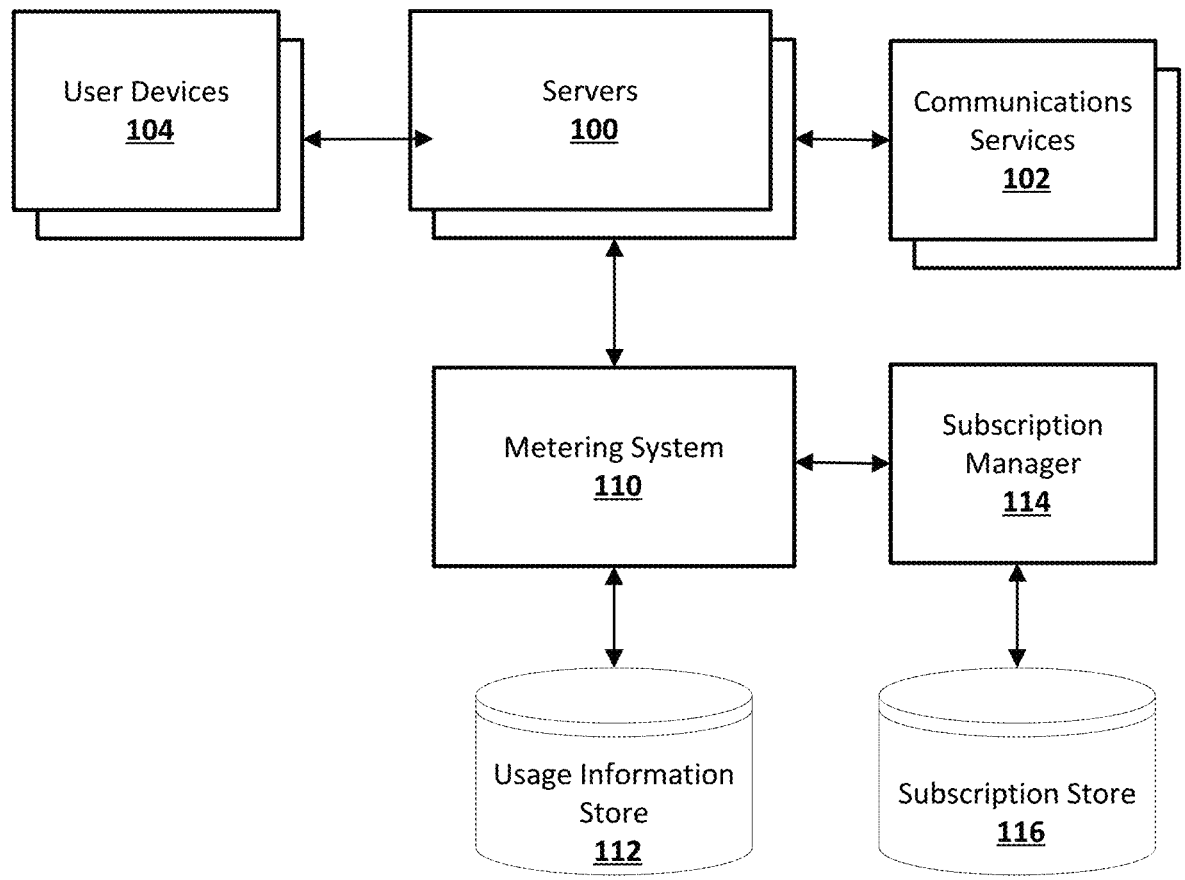
FIG. 1 schematically illustrates a high-level architecture of a metering and subscription system in a media conferencing framework.

FIG. 1 illustrates a high-level architecture of a metering and subscription system in a Web services framework, according to an embodiment. One or more servers 100 may serve as a frontend to one or more communication services 102 for various user devices 104. The communication services can be, for example, audio conferencing, video conferencing, chatting, and gaming services. Note that, while communication services 102 are shown outside servers 100 in FIG. 1, one or more of communication services 102 may be implemented on one or more of the servers 100. Metering system 110 may collect usage information for usage of the communication services 102 by one or more user devices 104, and save the usage statistics on the usage information store 112. The metering system 110 may also provide the usage statistics to one or more subscription managers 114 for billing, throttling, reporting, or other processes or services. The subscription manager 114 may store subscription data, such as billing data, billing policies, preferences and rates in effect for various clients, within a subscription information store 116. The subscription information store 112 may be implemented as one or more databases stored on one or more data storage devices and/or data storage systems. In an embodiment, subscription information may be partitioned into two or more partitions by the subscription manager 114. For example, the subscription information may be partitioned by organization, individual user, location, etc. Each partition may include one or more systems or servers that each implement one or more instances of components of the subscription manager 114 that support that particular partition. Note that, in embodiments, the servers, partitions, and/or data storage devices or systems may be distributed across two or more data centers.

In an embodiment, components of metering system 110 may be implemented on one or more backend servers in the context of the Web services framework. Note, however, that one or more components of metering system 110 may be implemented on one or more of the Web services frontend servers 100. However, one or more backend servers (in the context of the Web services framework) that each implement one or more instances of one or more components of the metering system 110 may be considered frontend servers of the metering system itself, while one or more instances of one or more other components of the metering system 110 may be implemented on backend servers in the context of the metering system 110.

The usage information store 112 may be implemented as one or more databases stored on one or more data storage devices and/or data storage systems. In embodiments, usage information may be partitioned into two or more partitions by the metering system 110. For example, the usage information may be partitioned by organization, individual user, location, etc. Each partition may include one or more systems or servers that each implement one or more instances of components of the metering system 110 that support that particular partition.

In an embodiment, metering system 110 may provide an add usage operation via an add usage interface to add usage information to usage information store 112, and a get usage operation via a get usage interface, or query interface, to get communications services usage information from usage information store 112. In embodiments, the metering system interface may be exposed to, and used by, one or more components or processes of the Web services framework, such as the subscription manager 114. In embodiments, the metering system interface may be externally exposed to user devices 104.

In an embodiment, the metering system 110 may be exposed as a Web service via a Web Service interface that other entities may leverage to perform metering of services, applications, etc. An entity may implement functionality that intercepts calls to a service, such as the communications services 102, or other applications that are being metered. The entity may then make calls through the Web service interface to the metering system 110 to add usage information to and get usage statistics from the usage information store 112.

Embodiments of the metering system 110 as described herein may be implemented according to an architecture that is linearly scalable. Embodiments may be scaled quickly and easily with little or no risk of losing usage information, with minimum or no downtime, and without affecting the latency of the overall system. Servers 100 may be added as needed to send usage information into the metering system 110.

The subscription manager 114 collects usage records generated by the metering system 110 and, using the billing rates and policies in effect for various types of services and physical link usage by the user devices 104, provides subscription information to an organization and/or the user devices 104 as per their preferences. For example, according to one subscription policy, the subscription manager 114 may obtain a sum of all the costs for communications services measured for a particular user device 104 at various resource collections during a given subscription period. In another example, the subscription manager 114 may obtain time periods where a particular user device 104 actively uses the communications services 102. In this example, the subscription manager 114 may obtain the number of days a particular user device 104 is active within a month. The subscription manager 114 may then determine the cost for the communication services 102 by multiplying the number of active days by a predetermined rate to provide billing information to the user device 104, such as a client or an organization, or automatically charge the user device 104.

In some embodiments, the subscription manager 114 may provide separate billing amounts for different communications services, or for different time periods. For example, a video conferences service may be associated with a different billing rate than a chatting service. In another example, communications services 102 used during business hours may be associated with a different billing rate than communications services 102 used outside of business hours. The subscription manager 114 may allow clients to view consolidated billing information for linked client accounts.

Figure 2:
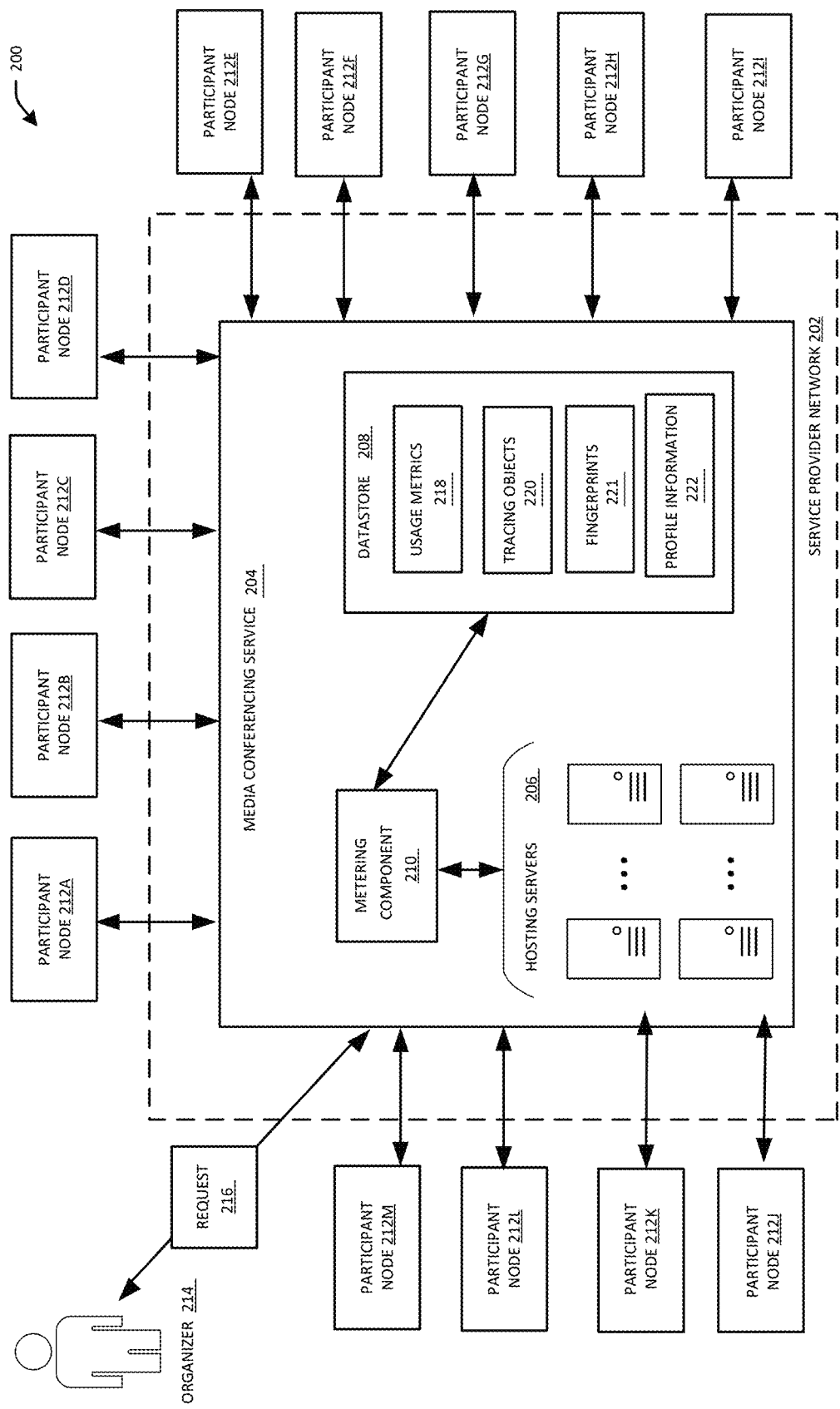
FIG. 2 schematically illustrates a system-architecture diagram of an example service provider network that provides a media conferencing service.

FIG. 2 schematically illustrates an example environment 200 that includes a service provider network 202. The service provider network 202 provides various services to users, such as participant nodes 212A-M, which can be the user devices 104. For example, the service provider network 202 can provide computing resources, like Virtual Machine (VM) instances and storage, on a permanent or an as-needed basis. In particular, the computing resources provided by the service provider network 202 can include various types of computing resources, such as data processing resources like VM instances, data storage resources, networking resources, data communication resources, network services, and the like. Common expressions associated with the service provider network may include, for example, "on-demand computing," "software as a service (SaaS)," "cloud services," "data centers," and so forth. Services provided by the service provider network 202 may be distributed across one or more physical or virtual devices.

In the example environment 200, the service provider network 202 includes a media conferencing service 204. The media conferencing service 204 may include multiple hosting servers 206. In some embodiments, the multiple hosting servers 206 may be the frontend servers 100 and located in multiple geographical locations. In some embodiments, the media conferencing service 204 also includes a data store 208 and a metering component 210. In some embodiments, the metering component 210 may be the metering system 110. The media conferencing service 204 may facilitate initiation of the media conference or may otherwise allow the media conference to take place via hosting server (or servers) 206.

Multiple participant nodes 212A-M are illustrated in the example environment 200. The participant nodes 212A-M represent participants, user devices, clients, and/or users for media conferences provided by the media conferencing service 204. The media conferences may be, for example, the communications services 102. The participant nodes 212A-M interact with the media conferencing service 204 and the hosting servers 206 via electronic devices such as, for example, smart phones, tablets, laptop computers, desktop computers, telephones, etc. In configurations, the media conferences may comprise text, audio, and/or video, e.g., one or more of the participant nodes 212A-M may participate in a media conference that includes both audio and video (e.g., a video teleconference (VTC)). Text, audio, and/or video Content can be set between the participant nodes 212A-M via the media conference service 204. The media conference may be part of a gaming platform.

When one or more of the participant nodes 212A-M wish to participate in a media conference, an organizer 214 of the media conference may send a request 216 for the media conference to the media conferencing service 204. The organizer 214 may also be a participant in the media conference.

The metering component 210 may gather and evaluate shadow objects and characteristics of the participant nodes 212A-M using the media conferencing service 204. The shadow objects can be a proxy for users and can be used to trace participants and/or devices using the media conference service 204. The metering component 210 may determine which users connect to the media conferencing service 204 over time, how long they are connected to the media conferencing service 204, what devices are used by the users to connect, and the types of media conferencing services that are used, such as video, audio, text, and gaming. In some embodiments, the metering component 210 may continually monitor the participants of a media conference. For example, if additional participant nodes 212A-M join the media conference or if participation nodes 212A-M leave the media conference before the media conference is completed, the metering system 110 may record the times of arrival and the times of exit of the participants in the media conference. In some environments, the metering system 110 may also determine whether the user was active in the media conference based on the duration the participant spent in the media conference. For example if a participant mistakenly joins a media conference for less than a predetermined amount of time, the metering system 110 may determine that the participant was not active in the media conference. The dynamic evaluation of ongoing media conferences may also take into account the operational constraints and/or the user preferences while dynamically evaluating the media conference.

Information from the metering component 210 can be sent to the data store 208. For example, the usage metrics of the participant nodes 212A-M can be stored in the usage metrics database 218. The shadow objects that are forwarded to and received from the participant nodes 212A-M can be saved in the shadow objects database 220, the characteristics of the participant nodes 212A-M can be received and stored in the fingerprints database 221. The profile information for each user of the media conferencing service 204 can be saved in the profile information database 222. The profile information for each user or organization can include an identifier of the user, the organization associated with the user, user demographic information such as gender, age, occupation, income, marital status, etc., and preferences of the user. In some embodiments, the information from the metering component 210 may be stored elsewhere in the service provider network 202 outside of the data store 208.

Figure 3:
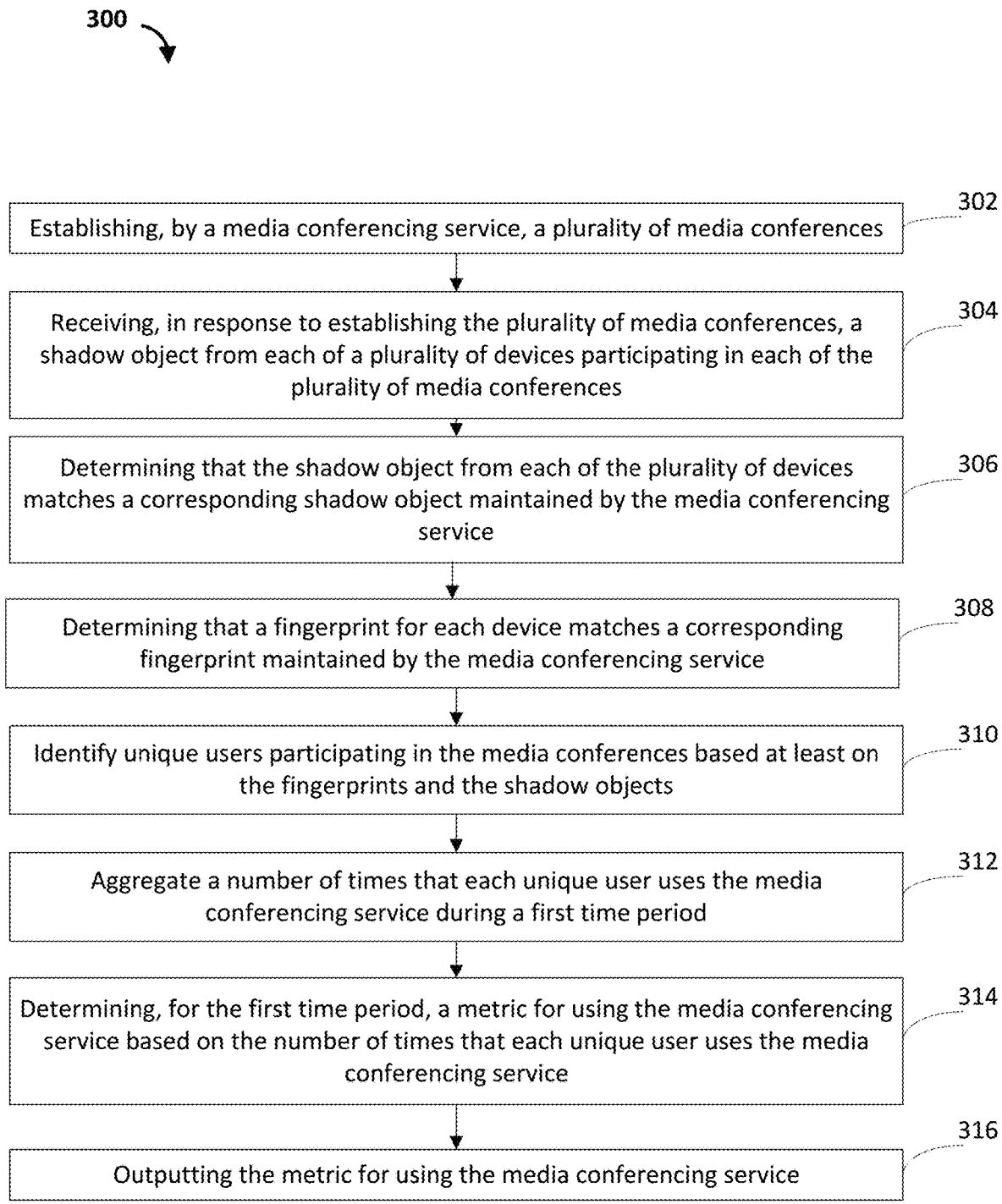
FIG. 3 is a flowchart showing an example process for determining a metric for using the media conferencing service.

FIG. 3 illustrates a flow diagram of an example method 300 that illustrates aspects of the functions performed at least partly by the service provider network 202. The example method 300 may be implemented to determine a metric for using the media conferencing service. For example, the method 300 may be implemented to identify unique users of the media conferencing service 204 of the service provider network 202 and to determine subscription and/or billing information associated with use of the media conferencing service 204. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 3, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

At block 302, the media conferencing service 204 establishes a plurality of media conferences. The media conferences can be established between the organizer 214 and one of more of the participant nodes 212A-M, or only between the participant nodes 212A-M. The plurality of media conferences can be established individually over time or some can be established simultaneously. In some embodiments, at least two of the media conferences can overlap in duration.

The plurality of media conferences can include an audio conference, a video conference, a chat session, or a gaming session.

The plurality of media conferences can be established by the media conferencing service 204 in response to a request 216 from the organizer 214. The request 216 may include an identifier of the organizer 214, identifiers of the participant nodes 212A-M, a date, time, and/or duration for the media conference. The request 216 may also include an anticipated location for each participant node 212A-M. The organizer 214 of each of the plurality of media conferences may be the same or may be different. In some embodiments, the same organizer 214 can organize some of the plurality of media conferences. The participants, such as the participant nodes 212A-M, of the media conferences may belong to the same organization or may belong to different organizations, such as different corporations.

Figure 4:
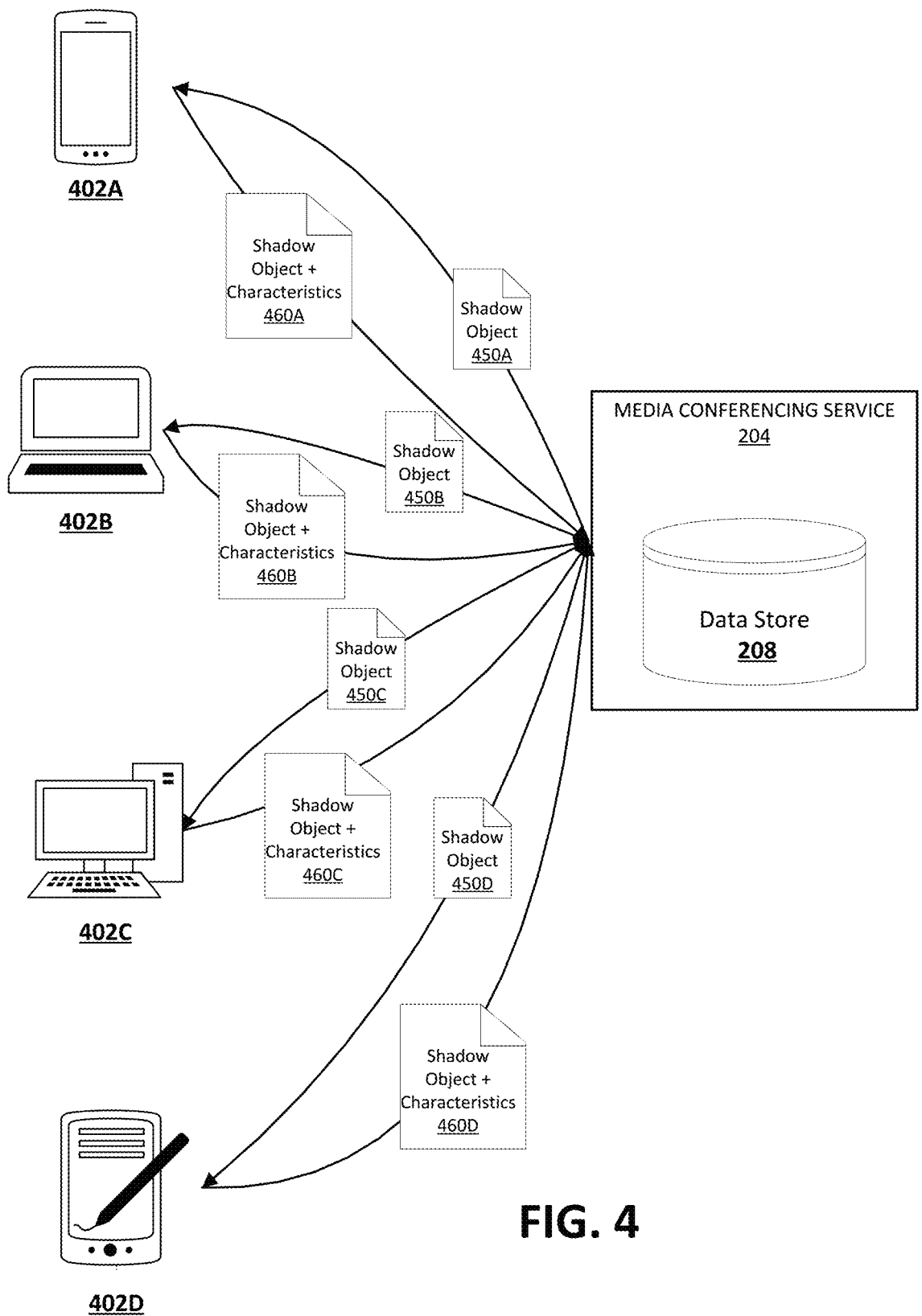
FIG. 4 schematically illustrates a high-level architecture of a plurality of user devices sending and receiving information to and from a system.

As illustrated in FIG. 4, following the establishment of a media conference, the media conferencing service 204 may send shadow objects 450A-D to devices 402A-D. FIG. 4 schematically illustrates a high-level architecture of a plurality of user devices sending and receiving information to and from a system. The devices 402A-D may correspond to the participant nodes 212A-M. The shadow objects 450A-D can be, for example, cookies, tokens, session identifiers, WebSocket identifiers, client certificate chains, metadata in the HTTP or Transport Layer Security protocols, or another tracer that can be used to identify a user of the media conferencing service 204. The shadow objects 450A-D, such as cookies, can be stored by a web browser executing on the devices 402A-D. When a device 402A-D connects to the media conferencing service 204 for the first time, or any subsequent time, the shadow object 450A-D and characteristics of the device can be sent in data 460A-D to the media conferencing service 204. The shadow objects 450A-D and the characteristics the device can be saved in the data store 208, such as in shadow objects database 220 and the fingerprints database 221. A profile or record of a user stored in the profile information database 222 can be associated with each shadow object 450A-D. In some embodiments, the shadow objects can also be used to authenticate the devices 402A-D.

In some embodiments, the shadow objects 450A-D can be associated with other data, such as an identifier of the devices 402A-D, or communications session identifier (e.g., a session identifier and/or the particular communications session in which the devices 402A-D and the media conferencing service 204 are engaged) that may be used to identify a record associated with the devices 402A-D.

At block 304, a shadow object, such as the shadow objects 450A-D, from each of a plurality of devices participating in each of the plurality of media conferences is received at the media conferencing service 204 in response to establishing the plurality of media conferences. The shadow object may be transmitted from each of the participant nodes 212A-M as each enters a media conference. For example, the shadow object may be received as part of data 460A-D. The shadow object may be a cookie, a token, or another such object that identifies a participant node 212A-M and/or a user of the participant node 212A-M. Alternatively, any other means of identifying a device participating in a media conference or a user participating in a media conference are contemplated. For example, an alphanumeric identifier of the participant node 212A-M or user participating in a media conference may be received.

The shadow object received at the media conferencing service 204 may have previously been transmitted to a participant node 212A-M upon the first participation of the participant node 212A-M in a media conference of the media conferencing service 204. For example, the first time a participant node 212A participates in a media conference, the media conferencing service 204 may forward a shadow object, such as the shadow object 450A illustrated in FIG. 4, to the participant node 212A. The shadow object may be based on identification information or login information of the user, Such as a username, when the user connects to the media conferencing service 204. As such, if the user connects to the media conferencing service 204 from multiple devices, the same shadow object may be sent to the different devices. That same shadow object 450A-D may then be transmitted back to the media conferencing service 204 in data 460A-D in subsequent media conferences to identify the participant node 212A.

In some embodiments, the media conferencing service 204 may forward a shadow object 450A-D to the participant nodes 212A-M each time a media conference is established and the participant nodes 212A-M may then forward the shadow object back to the media conferencing service 204. In some embodiments, the media conferencing service 204 may forward a shadow object 450A-D to the participant nodes 212A-M at periodic intervals, such as a predetermined time period, such as once a month, or following a predetermined number of media conferences. In such an example, the media conferencing service 204 may first forward a shadow object 450A-D to a participant node 212A-M following the participation of, for example, five, ten, or 30 media conferences.

At block 306, the media conferencing service 204 determines that the shadow object received from each of the plurality of participant nodes 212A-M matches a corresponding shadow object maintained by the media conferencing service 204. The shadow objects can be stored at the media conferencing service 204 securely, using encrypted files, communications, communications links, etc. The media conferencing service 204 may compare each received shadow object from a participant node 212A-M to the shadow objects database 220. The shadow objects database 220 may store all of the shadow object 450A-D sent by the media conferencing service 204. When a shadow object received from a participant node 212A-M matches a corresponding shadow object stored in the database storing shadow objects 220, information regarding the user or the device associated with the shadow object can be retrieved from the profile information database 222. In addition, usage of the media conferencing service 204 for the user or device associated with the shadow object can be added to the usage metrics database 218. For example, the number of minutes, hours, days, months, and/or years that the user or the device associated with the shadow object uses the media conferencing service 204 can be incremented. In addition, a predetermined time interval, such as a day, can be considered active when the user or the device associated with the shadow object participated in a media conference during the predetermined time interval. To be considered active, a user may only be present in the media conference, may contribute content to the media conference, or may record the media conference. The media conferencing service 204 may change the definition of an active user for different users, organizations, or over time.

If a shadow object received from a participant node 212A-M does not match a corresponding shadow object maintained by the media conferencing service 204, then a new profile for the user or the device associated with the shadow object can be created in the profile information database 222. The profile information can be populated with additional information that may be received about the device or the user from the service provider network 202 or from another network, such as a social media network. The information can include a user name, data transmission activity, content access activity, a location, an IP address, a browser identifier, a user identifier, a MAC address, a user agent, an operating system identifier, hardware characteristics, or authentication codes, such as a code from a hardware authentication device, a code from a two factor authentication system, hardware tokens, software tokens, or an SMS code. Some or all of the profile information stored in the profile information database 222 can be used to create what may be referred to as a fingerprint for each participant node 212A-M. A fingerprint is a representation of a node or device that is detectable by the media conferencing service 204 and used to identify a particular node or device.

At block 308, the media conferencing service 204 determines that a fingerprint for each of the plurality of participant nodes 212A-M matches a corresponding fingerprint maintained by the media conferencing service 202. The fingerprints can be stored in a fingerprints database 221 in the data store 208 at the media conferencing service 204 securely, using encrypted files, communications, communications links, etc. The media conferencing service 204 may compare information received about a device of each participant node 212A-M, i.e., a fingerprint of the device, that is received in data 460A-D to previous fingerprints stored the fingerprints database 221 for participant nodes 212A-M that have participated in prior media conferences or for profiles that have been saved. When a fingerprint received from a participant node 212A-M matches a corresponding fingerprint, information regarding the user or the device associated with the fingerprint can be retrieved from the profile information database 222. In addition, usage of the media conferencing service 204 for the user or device associated with the fingerprint can be added to the usage metrics database 218.

If characteristics of the device of the participant node 212A-M, i.e., fingerprint of the device, received from the participant node 212A-M in data 460A-D does not match a corresponding fingerprint maintained by the media conferencing service 204, then a new fingerprint for the device associated with the fingerprint can be created in the fingerprints database 221. The fingerprint can also be associated with profile information stored in the profile information database 222.

As shown in FIG. 4, the shadow object and the characteristics of the device may be received from each of the devices 402A-D at the same time in data 460. In some examples, however, the shadow objects and the characteristics of the devices may be received from the devices 402 A-D at different times and in subsequent data. For example, the shadow objects can be received before the characteristics of the device.

At block 310, the media conferencing service 204 identifies unique users participating in the media conferencing service 204 based at least on the fingerprints and the shadow objects received from the participant nodes 212A-M. In some examples, a user of the media conferencing service 204 may use two or more devices, such as two or more of the devices 402A-D. In other examples, a device, such as the desktop computer 402C, might be used by a plurality of users, such as two or more users in an organization. Therefore, to correctly meter use of the media conferencing system 204, the number of unique users are identified. For example, where the shadow object and the fingerprint match a previously stored shadow object and fingerprint, respectively, it may be determined that the user associated with both the shadow object and the fingerprint is the same. In such an example, one unique user may be identified.

In some examples, a user may try to spoof the media conferencing service 204 by providing the same identification or login information of a unique user to multiple users. This may be done when the user subscribes to the media conferencing service 204 on a cost per user basis. By reusing the identification or login information for multiple users, the cost for using the media conferencing service 204 may be inappropriately shared between the multiple users. In this example, as the multiple users access the media conferencing service 204 with the same credentials, the user associated with the shadow object will be the same. However, because each user uses a different device, the fingerprint from each device will different. If the fingerprint has previously been associated with another user, then two unique users may be identified in such an example. However, if the fingerprint has not been previously associated with another user, then the device may be associated with the same unique user. As will be discussed further with respect to FIG. 5, in such an example, a device-to-user ratio would then increase to, for example, 2:1.

In some embodiments, the media conferencing service 204 may determine that certain shadow objects are associated with spoofed accounts. Spoofed accounts may be associated with device-to-user ratios that are above a predetermined threshold, as discussed further with respect to FIG. 5. If a request for a media conference is received from one of the participant nodes 212A-M associated with a known spoofed shadow object, the media conferencing service 204 may not establish a media conference for that request. In some embodiments, a participant node 212A-M may itself be known as a spoofed node, so the media conferencing service 204 may not establish a media conference for that node.

The technique of identifying unique users may also have applicability to detecting unauthorized users that may have improperly gained access to a conference hosted by the media conferencing service 204. By identifying the system can prevent ease dropping or other malicious activity.

At block 312, the media conferencing service 204 aggregates a number of times that each unique user uses the media conferencing service 204 during a first time period. The number of times can be accessed from the usage metrics database 218 that may be updated following the establishment of each media conference. A time can constitute participation in a single media conference, or constitute participation in one or more media conferences over a time period, such as a day. The first time period may be a minute, hour, day, month, and/or year that the user uses the media conferencing service 204. For example, the number of times that a unique user uses the media conferencing service 204 during a first time period maybe a number of days that a unique user uses the media conferencing service 204 over the course of a month. In another example, the number of times that a unique user uses the media conferencing service 204 during a first time period maybe a number of days that unique user uses the media conferencing service 204 over the course of quarter or a year.

If an organization includes multiple users, then the number of days that all of the users of the organization use the media conferencing service 204 over a first time period, such as a month, can be aggregated. For example, a first user of an organization may be active for five days over the course of a month and a second user of the organization may be active for 16 days over the course of a month. The media conferencing system 204 would then aggregate 21 active days for the organization over the course of the month. The number of active days may be used for subscription or billing costs, as explained further below.

At block 314, the media conferencing service 204 can determine a metric for using the media conferencing service 204 based on the number of times that each unique user uses the media conferencing service for the first time period. The first time period, such as a month, can be established by the media conferencing service 204, by a user of the media conferencing service 204, or by an organization contracted to use the media conferencing service 204. In some embodiments, the metric can be a cost associated with use of the media conferencing service 204 over the first time period. The metric can be calculated by multiplying the times that the media conferencing service 204 is used by a cost associated for each time that the media conference service 204 is used. For example, if the media conferencing service 204 is used for a total of 21 active days by two users of an organization over a month, the cost for each active day can be multiplied by twenty-one to determine the costs associated with use of the media conferencing service 204 for a month.

In another example, an organization may acquire a subscription for a maximum number of uses over the first time period. In such a case, the media conferencing service 204 may determine whether the total number of media conferences of users of the organization exceeds the maximum number of uses that are included in the subscription of the organization. If the maximum number of uses is exceeded over the first time period, then an additional cost may be associated with the use of the media conferencing service 204 by the organization. In some examples, the cost associated with each active day or each media conference can decrease as the number of active days or the number of media conferences over the first time period is greater. In such an example, there may be a volume discount provided.

At block 316, the media conferencing service 204 may output the metric for using the media conferencing service. In an embodiment, the metric can be transmitted to, for example, a subscription service, such as the subscription manager 114. In an embodiment, the metric, such as the costs associated with use of the media conferencing service 204, can be forwarded to a user or an organization for accounting such as by payment or other cost allocations such as predefined advertising arrangements and so on.

Figure 5:
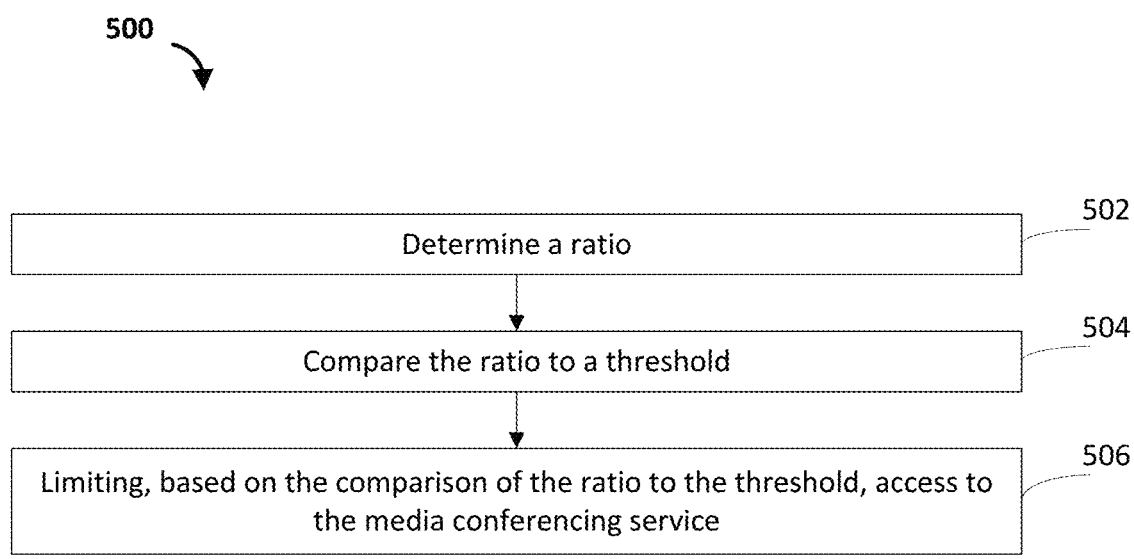
FIG. 5 is a flowchart showing an example process for limiting access to the media conferencing service.

If a user or an organization attempts to spoof the media conferencing service 204, then access to the media conferencing service 204 maybe limited and/or blocked. FIG. 5 illustrates a flow diagram of an example method 500 that illustrates aspects of the functions performed at least partly by the service provider network 202. The example method 500 may be implemented to limit and/or block access to the media conferencing service 204 if spoofing and/or misuse is detected. For example, the method 500 may be implemented to limit and/or block a user or an organization when the same user information, user login, and/or shadow object for a single user is provided to multiple users of multiple devices. A device that is spoofed or is an otherwise unauthorized connection to the media conferencing service 204 is improperly connected to the media conferencing service 204. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 5, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

At block 502, a ratio is determined. The ratio can be the number of devices may be determined based on the number of unique fingerprints received from the participant nodes 212A-M, or the devices 402A-D, of the media conferences. In some embodiments, the number of devices may be divided by the number of unique users determined in step 310 of the method 300 to determine the ratio. In some embodiments, the ratio may be determined for all active users of an organization. For example, the number of unique users may be received from the organization itself. An organization may report, for example, that it has five active users. The number of devices determined based on the unique fingerprints may be divided by the number of reported active users from the organization to determine the ratio. In another example, the number of unique users may be determined by the media conferencing service 204 based on the received shadow objects. In this example, the number of devices determined based on the unique fingerprints may be divided by the number of active users determined by the media conferencing service 204.

In some embodiments, the ratio of the number of devices to the unique users can be determined based on concurrency of data reception and transmission between different devices during a media conference. For example, if multiple devices associated with include a single shadow object are transmitting and receiving content from the media conferencing service 204 concurrently, those number of devices can be associated with the same unique user. For example, if four devices are concurrently transmitting and receiving content during a single media conference and are associated with an account for the same user, then the ratio would be 4:1.

In some embodiments, the ratio can instead be the number of concurrent active conferences associated with each unique user. For example, if the same unique user is participating in two or more concurrent active media conferences, a user or an organization can be determined to be spoofing the media conferencing service 204. In some embodiments, the ratio can be the number of sessions requested by the same unique organizer 214. For example, if one organizer 214 is requesting three, five, ten, etc., times the number of media conferences as an average organizer, a user or an organization can be determined to be spoofing the media conferencing service 204.

At block 504, the ratio of the devices to the unique users is compared to a threshold. The threshold can be any number set by the media conferencing service 204. For example, the threshold can be set as two, such that every unique user can use an average of two devices, such as a work computer, such as laptop 402B and desktop computer 402C, and a mobile device, such as mobile phone 402A and tablet 402D, before spoofing is suspected. In some embodiments, the threshold can be greater than one but less than two less than two, or greater than two. The threshold can also be a fraction, such as 1.3.

At block 506, access to the media conferencing service 204 is limited based on the comparison of the ratio to the threshold. In some embodiments, access to the media conferencing service 204 may be limited and/or blocked when the ratio exceeds the threshold. For example when an average of five devices are associated with each unique user of an organization, spoofing may be detected and access to the media conferencing service 204 may be limited and/or blocked. In some embodiments, when the number of concurrent active conferences associated with each unique user or the number of sessions requested by the same unique organizer are greater than a threshold, spoofing may be detected and access to the media conferencing service 204 may be limited and/or blocked. The media conferencing service 204 may limit access to media conferences by only allowing a certain number of user to access its services. The number of users may be limited to the number of users reported by the organization. In some embodiments, the media conferencing service 204 may block devices associated with known unauthorized shadow objects from participating in a media conference.

Figure 6:
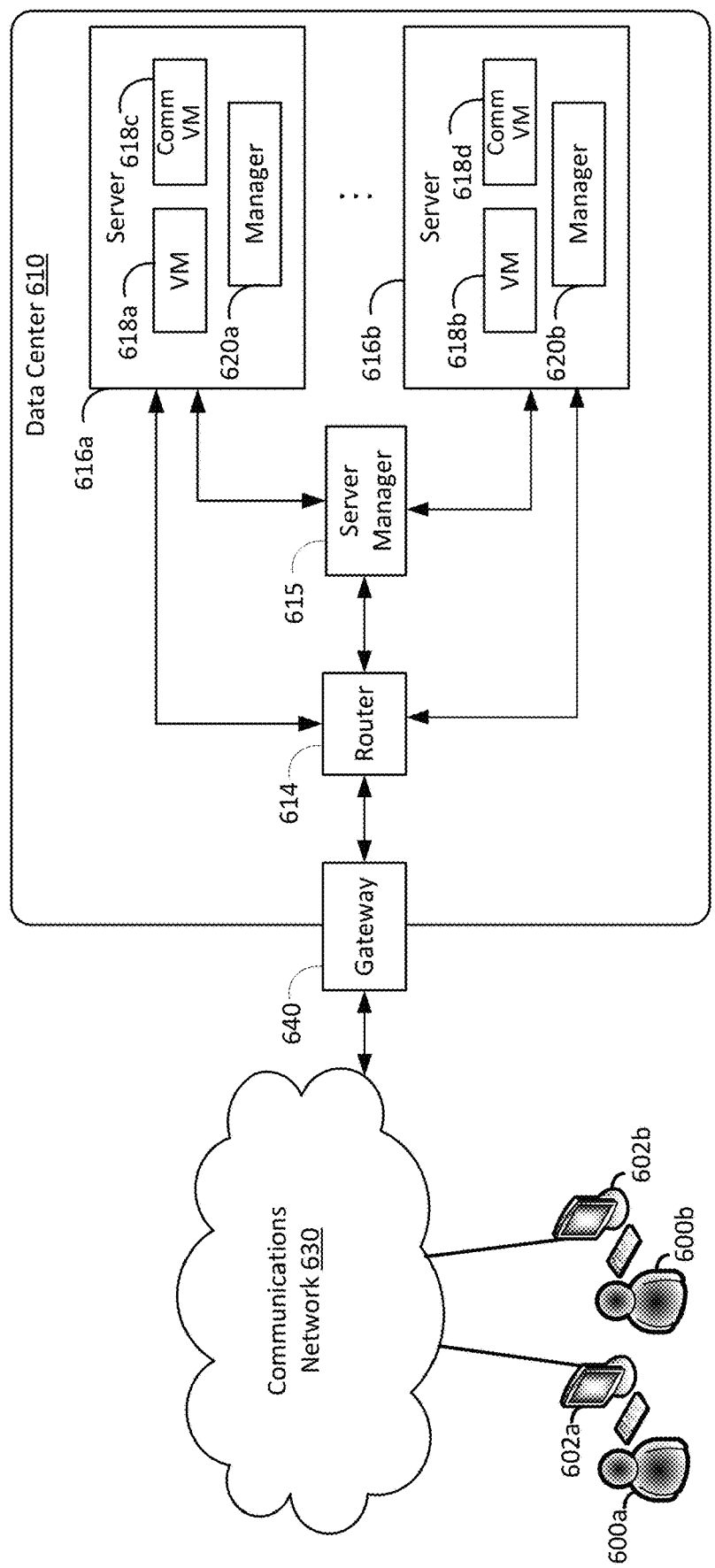
FIG. 6 is a diagram illustrating an example computing system that may be used in some embodiments.

FIG. 6 illustrates an example computing environment in which the embodiments described herein may be implemented. The example computing environment of FIG. 6 may be configured to implement one or more of the services platform, such as the communications services 102, the metering system 110, the subscription manager 114, or a combination thereof of FIG. 1. The example computing environment of FIG. 6 may be configured to implement the media conferencing service 204 of FIG. 2. The example computing environment of FIG. 6 may be configured to implement any of the methods described herein, such as any methods (e.g., or any operations) associated with FIGS. 3 and 5.

FIG. 6 is a diagram schematically illustrating an example of a data center 610 that can provide computing resources to users 600a and 600b (which may be referred herein singularly as user 600 or in the plural as users 600) via user computers 602a and 602b (which may be referred herein singularly as computer 602 or in the plural as computers 602) via a communications network 630. Data center 610 may be configured to provide computing resources for executing applications on a permanent or an as-needed basis. The computing resources provided by data center 610 may include various types of resources, such as gateway resources, load balancing resources, routing resources, networking resources, computing resources, volatile and nonvolatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 610 may include servers 616a-b (which may be referred herein singularly as server 616 or in the plural as servers 616) that provide computing resources. These resources may be available as bare metal resources, or as virtual machine instances 618a-d and (which may be referred herein singularly as virtual machine instance 618 or in the plural as virtual machine instances 618). Virtual machine instances 618c and 618d can be communication service virtual machine. The communication service virtual machine instances 618c and 618d may be configured to perform all or any portion of the communication services (e.g., contact center services, virtual environment services, determining virtual features, facilitating communication sessions, content services for accessing virtual environments) in accordance with the present disclosure and described in detail herein. As should be appreciated, while the particular example illustrated in FIG. 6 includes one communication service virtual machine in each server, this is merely an example. A server may include more than one communication service virtual machine or may not include any communication service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 630 may, for example, be a publicly accessible network of linked networks and possibly operated by various distinct parties, such as the Internet. In other embodiments, communications network 630 may be a private network, such as, a corporate or university network that is wholly or partially inaccessible to non-privileged users. In still other embodiments, communications network 630 may include one or more private networks with access to and/or from the Internet.

Communication network 630 may provide access to computers 602. User computers 602 may be computers utilized by users 600 or other customers of data center 610. For instance, user computer 602a or 602b may be a server, a desktop or laptop personal computer, a tablet computer, a wireless telephone, a personal digital assistant (PDA), an e-book reader, a game console, a set-top box or any other computing device capable of accessing data center 610. User computer 602a or 602b may connect directly to the Internet (e.g., via a cable modem or a Digital Subscriber Line (DSL)). Although only two user computers 602a and 602b are depicted, it should be appreciated that there may be multiple user computers.

User computers 602 may also be utilized to configure aspects of the computing resources provided by data center 610. In this regard, data center 610 might provide a gateway or web interface through which aspects of its operation may be configured through the use of a web browser application program executing on user computer 602. Alternately, a stand-alone application program executing on user computer 602 might access an application programming interface (API) exposed by data center 610 for performing the configuration operations. Other mechanisms for configuring the operation of various web services available at data center 610 might also be utilized.

Servers 616 shown in FIG. 6 may be standard servers configured appropriately for providing the computing resources described above and may provide computing resources for executing one or more web services and/or applications. In one embodiment, the computing resources may be virtual machine instances 618. In the example of virtual machine instances, each of the servers 616 may be configured to execute an instance manager 620a or 620b (which may be referred herein singularly as instance manager 620 or in the plural as instance managers 620) capable of executing the virtual machine instances 618. The instance managers 620 may be a virtual machine monitor (VMM) or another type of program configured to enable the execution of virtual machine instances 618 on server 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 614 may be utilized to interconnect the servers 616a and 616b. Router 614 may also be connected to gateway 640, which is connected to communications network 630. Router 614 may be connected to one or more load balancers, and alone or in combination may manage communications within networks in data center 610, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 610 shown in FIG. 6, a server manager 615 is also employed to at least in part direct various communications to, from and/or between servers 616a and 616b. While FIG. 6 depicts router 614 positioned between gateway 640 and server manager 615, this is merely an exemplary configuration. In some cases, for example, server manager 615 may be positioned between gateway 640 and router 614. Server manager 615 may, in some cases, examine portions of incoming communications from user computers 602 to determine one or more appropriate servers 616 to receive and/or process the incoming communications. Server manager 615 may determine appropriate servers to receive and/or process the incoming communications based on factors such as an identity, location or other attributes associated with user computers 602, a nature of a task with which the communications are associated, a priority of a task with which the communications are associated, a duration of a task with which the communications are associated, a size and/or estimated resource usage of a task with which the communications are associated and many other factors. Server manager 615 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
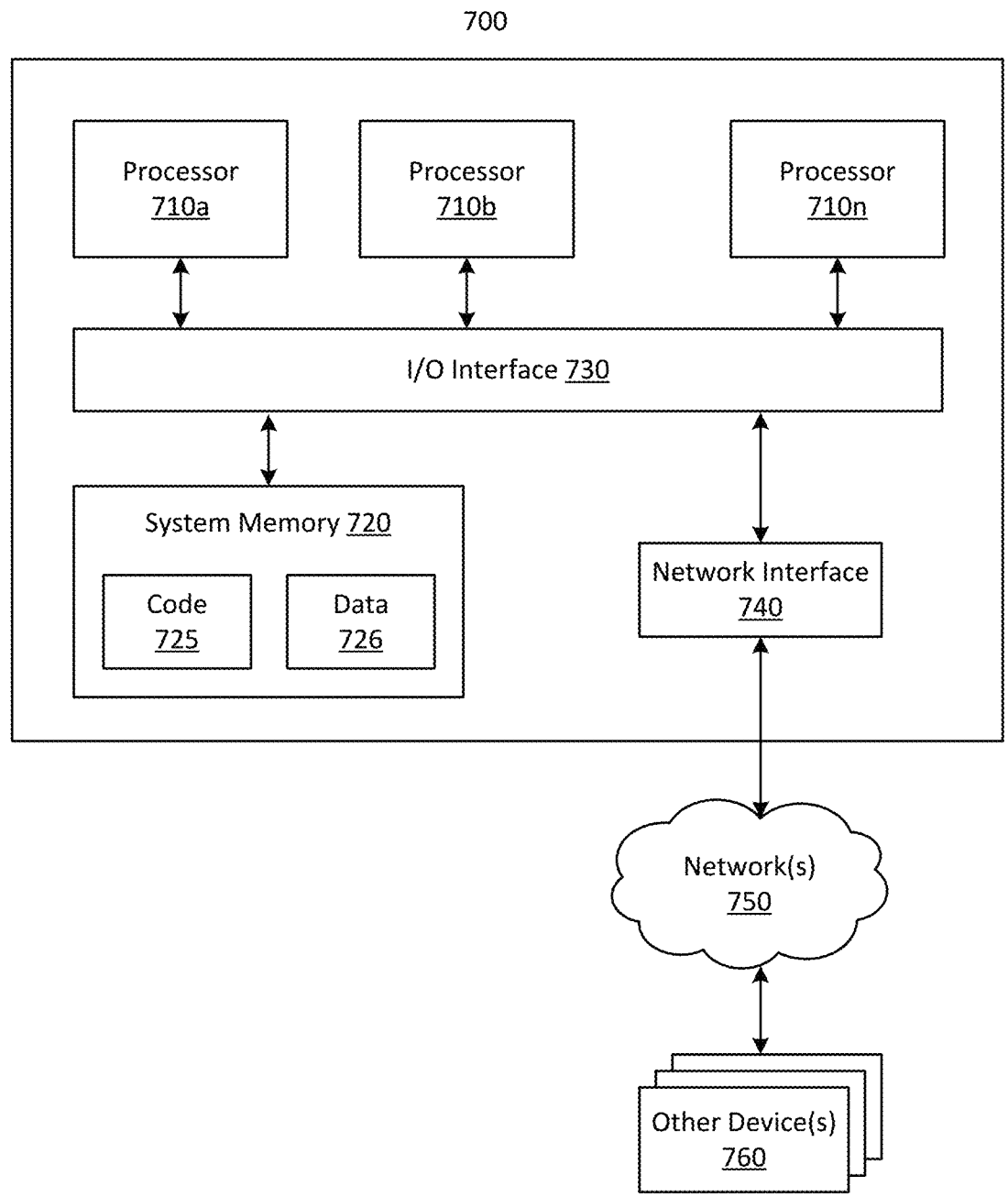
FIG. 7 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. The example computer system of FIG. 7 may be configured to implement one or more of the services platform, such as the communications services 102, the metering system 110, the subscription manager 114, or a combination thereof of FIG. 1. The example computing environment of FIG. 6 may be configured to implement the media conferencing service 204 of FIG. 2. The example computing environment of FIG. 6 may be configured to implement any of the methods described herein, such as any methods (e.g., or any operations) associated with FIGS. 3 and 5.

In the illustrated embodiment, computing device 700 includes one or more processors 710a, 710b and/or 710n (which may be referred herein singularly as "a processor 710" or in the plural as "the processors 710") coupled to a system memory 720 via an input/output (I/O) interface 730. Computing device 710 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 720 as code 725 and data 726.

In an embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fiber Channel SANs (storage area networks) or via any other suitable type of network and/or protocol.

In some embodiments, system memory 720 may be a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 730. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 700 as system memory 720 or another type of memory. Further, a computer-accessible medium may include transmission media or signals such as electrical, electromagnetic or digital signals conveyed via a communication medium such as a network and/or a wireless link, such as those that may be implemented via network interface 740. Portions or all of multiple computing devices such as those illustrated in FIG. 7 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As an example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones.

That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method comprising:
   establishing, by a media conferencing service, a plurality of media conferences;
   receiving, in response to establishing the plurality of media conferences, a shadow object from each of a plurality of devices participating in each of the plurality of media conferences;
   determining that the shadow object from each of the plurality of devices matches a corresponding shadow object maintained by the media conferencing service;
   determining that a fingerprint for each device matches a corresponding fingerprint maintained by the media conferencing service, the fingerprint comprising a plurality of characteristics that are used to identify each device;
   identifying unique users participating in the media conferences based at least on the fingerprints and the shadow objects;
   determining a ratio corresponding to a number of unique fingerprints divided by a number of unique users; and limiting access to the media conferencing service based on a comparison of the ratio to a threshold.

2. The computer implemented method of claim 1, wherein the plurality of characteristics that are used to identify each device comprise at least one of data transmission activity, content access activity, a location, an IP address, a browser identifier, a user identifier, a MAC address, a user agent, an operating system identifier, or hardware characteristics.

3. The computer implemented method of claim 1, wherein each media conference is at least one of an audio conference, a video conference, a chat session, or a gaming session.

4. The computer implemented method of claim 1, further comprising:
aggregating a number of times that each unique user uses the media conferencing service during a first time period; and
determining, for the first time period, a metric for using the media conferencing service based on the number of times that each unique user uses the media conferencing service; and
outputting, to a subscription service, the metric for using the media conferencing service.

5. The computer implemented method of claim 4, wherein the metric for using the media conferencing service comprises a cost for using the media conferencing service.

6. One or more non-transitory computer-readable storage media having stored thereon computing instructions that, upon execution by one or more computing devices, cause the one or more computing devices to perform operations comprising:
establishing, by a media conferencing service, a plurality of media conferences;
receiving, in response to establishing the plurality of media conferences, a shadow object from each of a plurality of devices participating in each of the plurality of media conferences;
determining that the shadow object from each of the plurality of devices matches a corresponding shadow object maintained by the media conferencing service;
determining that a fingerprint for each device matches a corresponding fingerprint maintained by the media conferencing service, the fingerprint comprising a plurality of characteristics that are used to identify each device;
identifying unique users participating in the media conferences based at least on the fingerprints and the shadow objects;
determining a ratio corresponding to a number of unique fingerprints divided by a number of unique users; and
limiting access to the media conferencing service based on a comparison of the ratio to a threshold.

7. The one or more non-transitory computer-readable storage media of claim 6, wherein the plurality of characteristics that are used to identify each device comprise at least one of data transmission activity, content access activity, a location, an IP address, a browser identifier, a user identifier, a MAC address, a user agent, an operating system identifier, or hardware characteristics.

8. The one or more non-transitory computer-readable storage media of claim 6, wherein each media conference is at least one of an audio conference, a video conference, a chat session, or a gaming session.

9. The one or more non-transitory computer-readable storage media of claim 6, wherein the operations further comprise:

aggregating a number of times that each unique user uses the media conferencing service during a first time period; and
determining, for the first time period, a metric for using the media conferencing service based on the number of times that each unique user uses the media conferencing service; and
outputting, to a subscription service, the metric for using the media conferencing service.

10. The one or more non-transitory computer-readable storage media of claim 9, wherein the metric for using the media conferencing service comprises a cost for using the media conferencing service.

11. A computing system comprising:
one or more processors; and
one or more memories having stored therein instructions that, upon execution by the one or more processors, cause the computing system to perform computing operations comprising:
establishing, by a media conferencing service, a plurality of media conferences;
receiving, in response to establishing the plurality of media conferences, a shadow object from each of a plurality of devices participating in each of the plurality of media conferences;
determining that the shadow object from each of the plurality of devices matches a corresponding shadow object maintained by the media conferencing service;
determining that a fingerprint for each device matches a corresponding fingerprint maintained by the media conferencing service, the fingerprint comprising a plurality of characteristics that are used to identify each device;
identifying unique users participating in the media conferences based at least on the fingerprints and the shadow objects;
determining a ratio corresponding to a number of unique fingerprints divided by a number of unique users; and
limiting access to the media conferencing service based on a comparison of the ratio to a threshold.

12. The computing system of claim 11, wherein the plurality of characteristics that are used to identify each device comprise at least one of data transmission activity, content access activity, a location, an IP address, a browser identifier, a user identifier, a MAC address, a user agent, an operating system identifier, or hardware characteristics.

13. The computing system of claim 11, wherein each media conference is at least one of an audio conference, a video conference, a chat session, or a gaming session.

14. The computing system of claim 11, wherein the operations further comprise:
aggregating a number of times that each unique user uses the media conferencing service during a first time period; and
determining, for the first time period, a metric for using the media conferencing service based on the number of times that each unique user uses the media conferencing service; and
outputting, to a subscription service, the metric for using the media conferencing service.

15. The computing system of claim 14, wherein the metric for using the media conferencing service comprises a cost for using the media conferencing service.

* * * * *